United States Patent
Steiman et al.

(10) Patent No.: US 10,496,815 B1
(45) Date of Patent: Dec. 3, 2019

(54) SYSTEM, METHOD, AND COMPUTER PROGRAM FOR CLASSIFYING MONITORED ASSETS BASED ON USER LABELS AND FOR DETECTING POTENTIAL MISUSE OF MONITORED ASSETS BASED ON THE CLASSIFICATIONS

(71) Applicant: Exabeam, Inc., San Mateo, CA (US)

(72) Inventors: Barry Steiman, San Ramon, CA (US); Derek Lin, San Mateo, CA (US); Sylvain Gil, San Francisco, CA (US); Domingo Mihovilovic, Menlo Park, CA (US)

(73) Assignee: Exabeam, Inc., San Mateo, CA (US)

( * ) Notice: Subject to any disclaimer, the term of this patent is extended or adjusted under 35 U.S.C. 154(b) by 721 days.

(21) Appl. No.: 14/974,766

(22) Filed: Dec. 18, 2015

(51) Int. Cl.
| | | |
|---|---|---|
| *G06F 21/55* | (2013.01) | |
| *G06Q 10/10* | (2012.01) | |
| *G06N 20/00* | (2019.01) | |
| *G06F 16/28* | (2019.01) | |
| *G06F 16/2457* | (2019.01) | |

(52) U.S. Cl.
CPC ...... *G06F 21/552* (2013.01); *G06F 16/24575* (2019.01); *G06F 16/24578* (2019.01); *G06F 16/285* (2019.01); *G06N 20/00* (2019.01); *G06Q 10/105* (2013.01)

(58) Field of Classification Search
CPC .......... G06F 21/552; G06F 16/285; G06F 16/24575; G06F 16/24578; G06N 20/00; G06Q 10/105
See application file for complete search history.

(56) References Cited

U.S. PATENT DOCUMENTS

| | | | |
|---|---|---|---|
| 6,223,985 B1 * | 5/2001 | DeLude | G07C 9/00015 235/379 |
| 6,594,481 B1 | 7/2003 | Johnson et al. | |
| 8,326,788 B2 | 12/2012 | Allen et al. | |
| 8,443,443 B2 | 5/2013 | Nordstrom et al. | |

(Continued)

OTHER PUBLICATIONS

Ioannidis, The History of Histograms (abridged), Proc. of the 29th VLDB Conf. (2003) retrieved from Internet <http://www.vldb.org/conf/2003/papers/S02P01.pdf> at pp. 1-12. (Year: 2003).*

(Continued)

*Primary Examiner* — Kamran Afshar
*Assistant Examiner* — Brent Johnston Hoover
(74) *Attorney, Agent, or Firm* — Lessani Law Group, PC

(57) ABSTRACT

The present disclosure describes a system, method, and computer program for classifying monitored assets based on user labels and for detecting potential misuse of monitored assets based on said classifications. Machine-learning-based modeling is used to classify one or more types of monitored assets with a select user label. A data model is created that reflects monitored assets used by users associated with the select user label. Each a time a user with the select user label accesses an applicable type of monitored asset, the data model is updated to reflect the event. The data model is used to classify one or more monitored assets with the select user label. If a user without the select user label uses a monitored asset classified with the select user label, a potential misuse of the monitored asset is detected.

18 Claims, 6 Drawing Sheets

(56) References Cited

U.S. PATENT DOCUMENTS

| | | | |
|---|---|---|---|
| 8,479,302 B1* | 7/2013 | Lin | G06F 21/62 |
| | | | 380/44 |
| 8,539,088 B2 | 9/2013 | Zheng | |
| 8,606,913 B2 | 12/2013 | Lin | |
| 8,676,273 B1 | 3/2014 | Fujisake | |
| 8,881,289 B2 | 11/2014 | Basavapatna et al. | |
| 9,055,093 B2 | 6/2015 | Borders | |
| 9,081,958 B2 | 7/2015 | Ramzan et al. | |
| 9,189,623 B1 | 11/2015 | Lin et al. | |
| 9,680,938 B1 | 6/2017 | Gil et al. | |
| 9,692,765 B2* | 6/2017 | Choi | H04L 63/102 |
| 9,760,240 B2 | 9/2017 | Maheshwari et al. | |
| 9,779,253 B2 | 10/2017 | Mahaffey et al. | |
| 9,898,604 B2 | 2/2018 | Fang et al. | |
| 10,095,871 B2 | 10/2018 | Gil et al. | |
| 2002/0107926 A1* | 8/2002 | Lee | G06Q 10/107 |
| | | | 709/206 |
| 2003/0147512 A1* | 8/2003 | Abburi | H04M 1/7255 |
| | | | 379/88.22 |
| 2004/0073569 A1 | 4/2004 | Knott et al. | |
| 2006/0090198 A1 | 4/2006 | Aaron | |
| 2007/0156771 A1* | 7/2007 | Hurley | G06F 21/552 |
| 2008/0040802 A1 | 2/2008 | Pierson et al. | |
| 2008/0170690 A1 | 7/2008 | Tysowski | |
| 2008/0301780 A1* | 12/2008 | Ellison | G06F 21/6218 |
| | | | 726/4 |
| 2009/0144095 A1 | 6/2009 | Shahi et al. | |
| 2009/0293121 A1 | 11/2009 | Bigus et al. | |
| 2010/0125911 A1 | 5/2010 | Bhaskaran | |
| 2010/0269175 A1 | 10/2010 | Stolfo et al. | |
| 2013/0080631 A1 | 3/2013 | Lin | |
| 2013/0117554 A1 | 5/2013 | Ylonen | |
| 2013/0227643 A1 | 8/2013 | Mccoog et al. | |
| 2013/0305357 A1* | 11/2013 | Ayyagari | H04W 12/06 |
| | | | 726/22 |
| 2013/0340028 A1 | 12/2013 | Rajagopal et al. | |
| 2014/0315519 A1 | 10/2014 | Nielsen | |
| 2015/0046969 A1 | 2/2015 | Abuelsaad et al. | |
| 2015/0121503 A1 | 4/2015 | Xiong | |
| 2015/0339477 A1 | 11/2015 | Abrams et al. | |
| 2015/0341379 A1 | 11/2015 | Lefebvre et al. | |
| 2016/0021117 A1 | 1/2016 | Harmon et al. | |
| 2016/0306965 A1* | 10/2016 | Iyer | G06F 21/552 |
| 2017/0161451 A1 | 6/2017 | Weinstein et al. | |
| 2017/0236081 A1 | 8/2017 | Grady Smith et al. | |

OTHER PUBLICATIONS

DatumBox Blog, "Machine Learning Tutorial: The Naïve Bayes Text Classifier", DatumBox Machine Learning Blog and Software Development News, Jan. 2014, pp. 1-11.

Wang, Alex Hai, "Don't Follow Me Spam Detection in Twitter", International Conference on Security and Cryptography, 2010, pp. 1-10.

* cited by examiner

SYSTEM, METHOD, AND COMPUTER PROGRAM FOR CLASSIFYING MONITORED ASSETS BASED ON USER LABELS AND FOR DETECTING POTENTIAL MISUSE OF MONITORED ASSETS BASED ON THE CLASSIFICATIONS

BACKGROUND OF THE INVENTION

1. Field of the Invention

This invention relates generally to monitoring use of computer networks and other enterprise assets for security risks, and, more specifically, to using machine-learning-based data models to classify assets with user labels and to detect potential misuse of assets.

2. Description of the Background Art

In computer environments, there are usually two main components—users and assets. An asset, within a computer environment, can include IT devices (e.g., workstations, servers, printers), personal phones, and offices with networked access (e.g., badged access). Users are either machine accounts or human user accounts that access these assets.

Within an IT network, human users are associated with a job role or an access level via access-control components, such as ACTIVE DIRECTORY™ or other identity-management systems. These user labels determine a user's access level within the network and the user's relationship to the enterprise organization.

Unlike users, it is very difficult to track or determine an asset's access level or organizational relationship since assets do not have a natural place in an identity management system. Also, an asset, such as employee's smart phone, may not be owned by the enterprise. This means that enterprises lack the ability to detect if a user is using an asset that does not belong to them or that they should not be accessing. This is a problem in monitoring for security risks or potential misuse of assts. For example, if there is no notion of an "executive asset," it is not possible to detect if a non-executive user is accessing an asset (e.g., a laptop) that normally is only used by an executive. Therefore, there is a need for a system and method that is able to tie user labels (e.g., "executive," "system administrator", etc.) to assets and to monitor for potential misuse accordingly.

SUMMARY OF THE DISCLOSURE

The present disclosure describes a system, method, and computer program for classifying monitored assets based on user labels and for detecting potential misuse of monitored assets based on said classifications. The method is performed by a computer system that has access to a stored mapping of users to user labels. The system uses machine-learning-based modeling to classify one or more types of monitored assets with a select user label. Specifically, the system creates a data model that reflects monitored assets used by users associated with the select user label. Each a time a user with the select user label accesses an applicable type of monitored asset, the data model is updated to reflect the event. Applicable types of monitored assets may be all monitored assets or a subset of monitored assets (e.g., workstations), depending on how the system is configured. For example, if a data model for the "executive" label is limited to workstation assets, then the data model is updated only if a user with the "executive" label accesses a device labeled as a "workstation."

The system uses the data model to classify one or more monitored assets with the select user label. If a user without the select user label uses a monitored asset classified with the select user label, the system detects a potential misuse of the monitored asset.

In certain embodiments, using the data model to classify one or more monitored assets comprises identifying assets in the data model that have a frequency-of-use value above a certain threshold, and classifying the identified monitored assets with the select user label.

In certain embodiments, the select user label indicates that the user is an executive or high-privileged user in an enterprise.

In certain embodiments, the data model is a histogram with the monitored assets on one axis, and frequency-of-use values on another axis.

In certain embodiments, the system increases a risk assessment associated with the user's activities in response to detecting a potential misuse of a monitored asset.

In certain embodiments, an applicable monitored asset is a monitored asset that is labeled otherwise determined to be a personal asset. Examples of personal assets are workstations, phones tablet computing devices, and personal offices.

In certain embodiments, the system creates a counter data model that reflects monitored assets used by users without the select user label. The system uses the data model and counter data model to distinguish between personal assets used primarily by users with the select user label and shared assets used frequently by both users with and without the select user label.

DETAILED DESCRIPTION OF THE PREFERRED EMBODIMENTS

The present disclosure describes a system, method, and computer program for classifying monitored assets based on user labels and for detecting potential misuse of monitored assets based on said classifications. The method is performed by a computer system that monitors enterprise assets for potential misuse. The system uses machine-based learning modeling to tie a user to an asset and to effectively transfer the user label to the asset.

Figure 1:
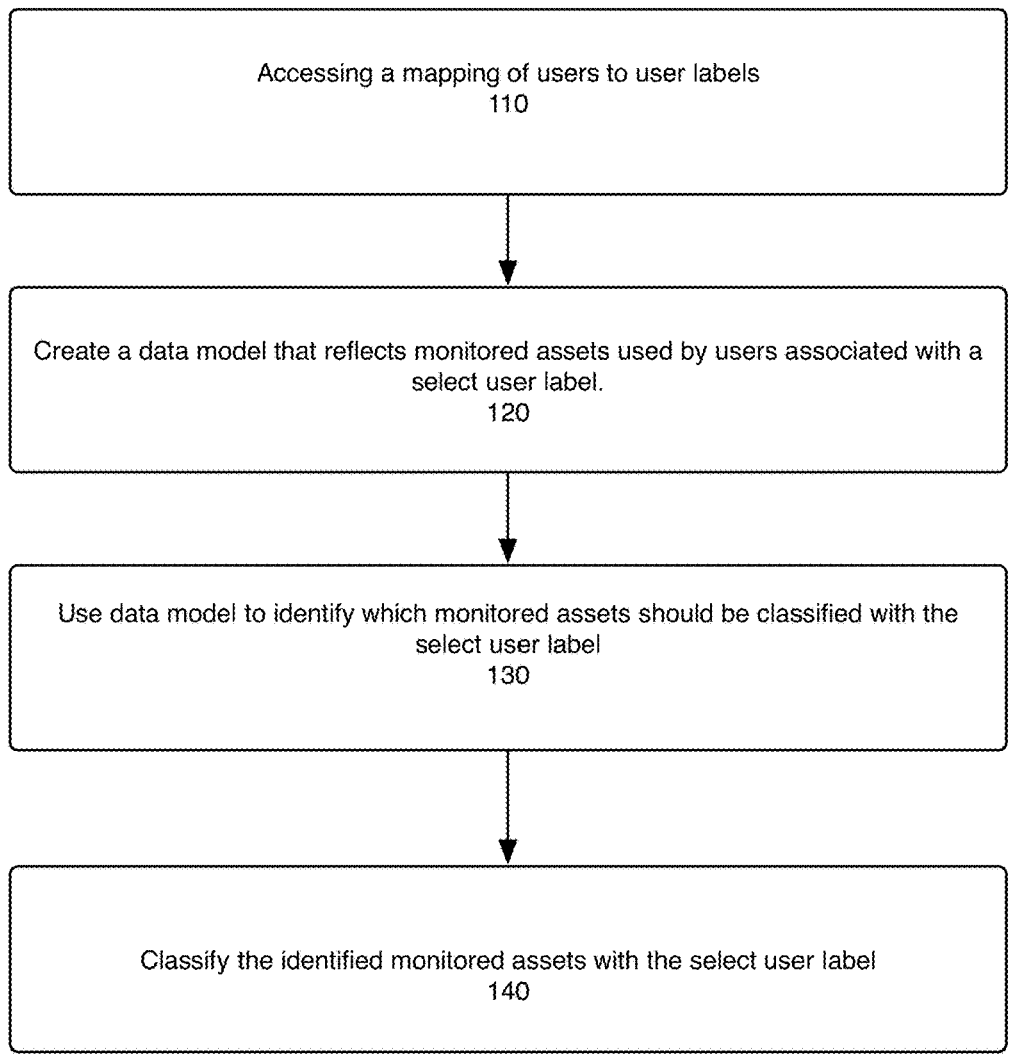
FIG. 1 is a flowchart that illustrate a method, according to one embodiment, for using machine-learning based modeling to classify one or more monitored assets with one or more select user labels.

FIG. 1 illustrates a method for using machine-learning-based modeling to classify one or more monitored assets with one or more select user labels. The system accesses a mapping of users to user labels (step 110). A user label corresponds to an attribute of a user relative to the enterprise. User labels may indicate a user's job title, seniority, access level in the department, department, office location, etc. A user may also be a machine user. An example of a machine user label is "service account." In one embodiment, user labels are read from an identity management system, such as MICROSOFT ACTIVE DIRECTORY™.

A monitored asset is any asset in an enterprise for which access to can be monitored by a computer. This includes computer devices (e.g., workstations, services, smartphones, etc.), electronic data and files (e.g., files, databases), and physical locations, such as buildings or offices that have electronic-access devices (e.g., badge readers)

For each of certain user label(s) ("select user labels"), the system creates a data model that reflects monitored assets used by user with the user label (step 120). Each time a user associated with one of the select user labels accesses a monitored asset (or an applicable type of monitored asset), the system updates the applicable data model to reflect the access event. The applicable data model is the data model that corresponds to the select user label in the access event. In certain embodiments in which a risk score is calculated for a user's session (see description of FIG. 5 below), the system refrains from updating the data model with the access event if the user's risk score is above a threshold (i.e., considered abnormal). This prevents data from a user session that is considered high risk or significantly abnormal from skewing the data models.

As discussed below, in one embodiments, the data models are histograms, where there is a separate histogram for each of the select user labels. A data model may be updated each time a user with an applicable user label accesses any type of monitored asset, or the data model may be limited to specific types of monitored assets (e.g., workstations). For example, if a data model for the "executive" label is limited to workstation assets, then the data model is updated only if a user with the "executive" label accesses an asset with a "workstation" asset label.

For each data model, the system uses the data model to identify which monitored assets within the data model should be classified with the user label corresponding to the data model (step 130). The identified assets in step 130 are then classified with the applicable user label (step 140). For example, if there is a data model for the label "executive," the system would classify the identified assets (e.g., workstations, phones, etc.) in the data model as being "executive" assets. The classifications change as the data model changes. For example, a particular workstation may be classified as an "executive asset" at one point, but, if an executive stops using the workstation, the data model eventually will reflect this and the workstation will no longer be classified as an "executive asset." Likewise, if an executive starts using a new workstation, eventually the data model will reflect that this is an executive asset.

Figure 2A:
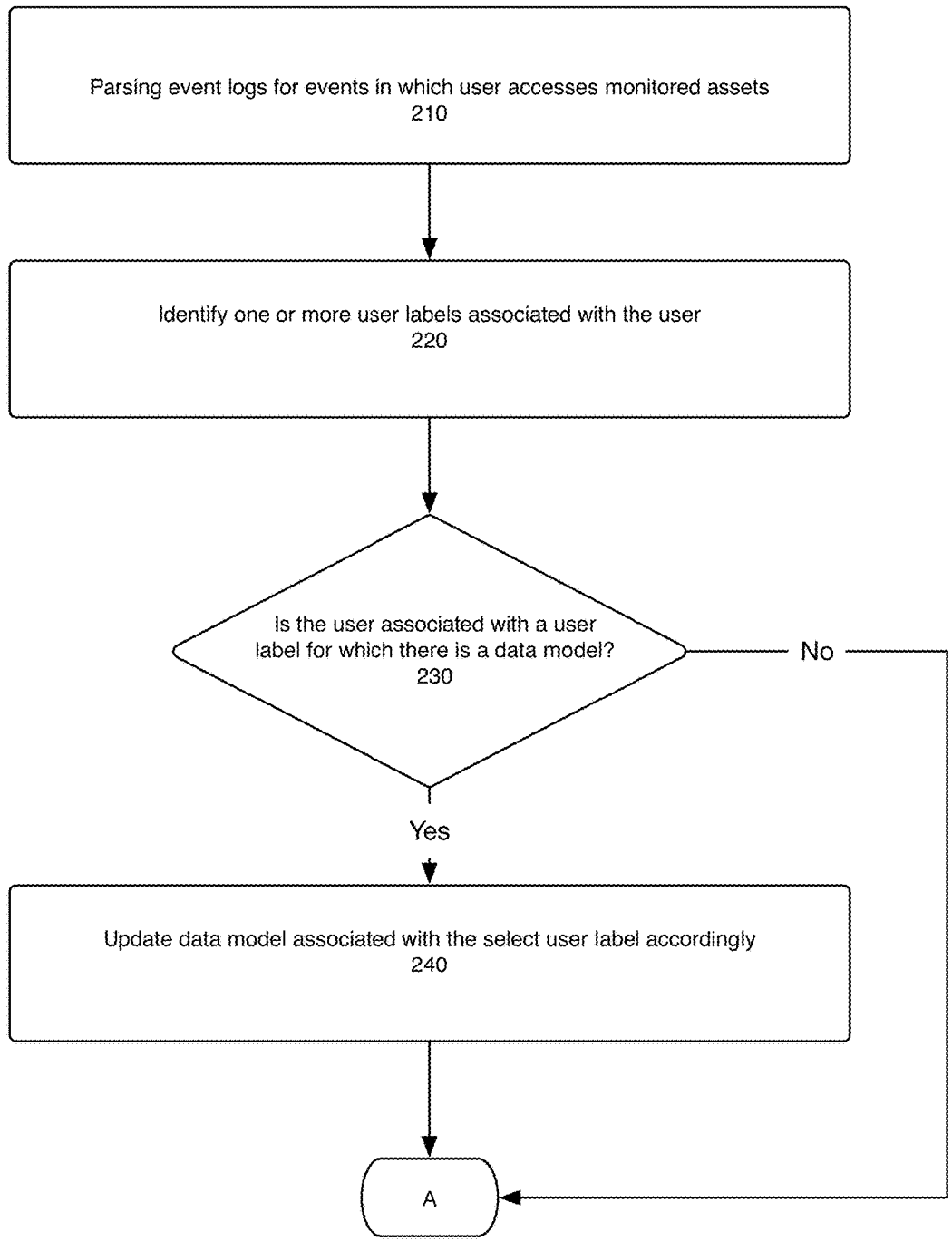
FIGS. 2A-B are flowcharts that illustrate a method, according to one embodiment, for detecting potential misuse of monitored assets using the classifications.
Figure 2B:
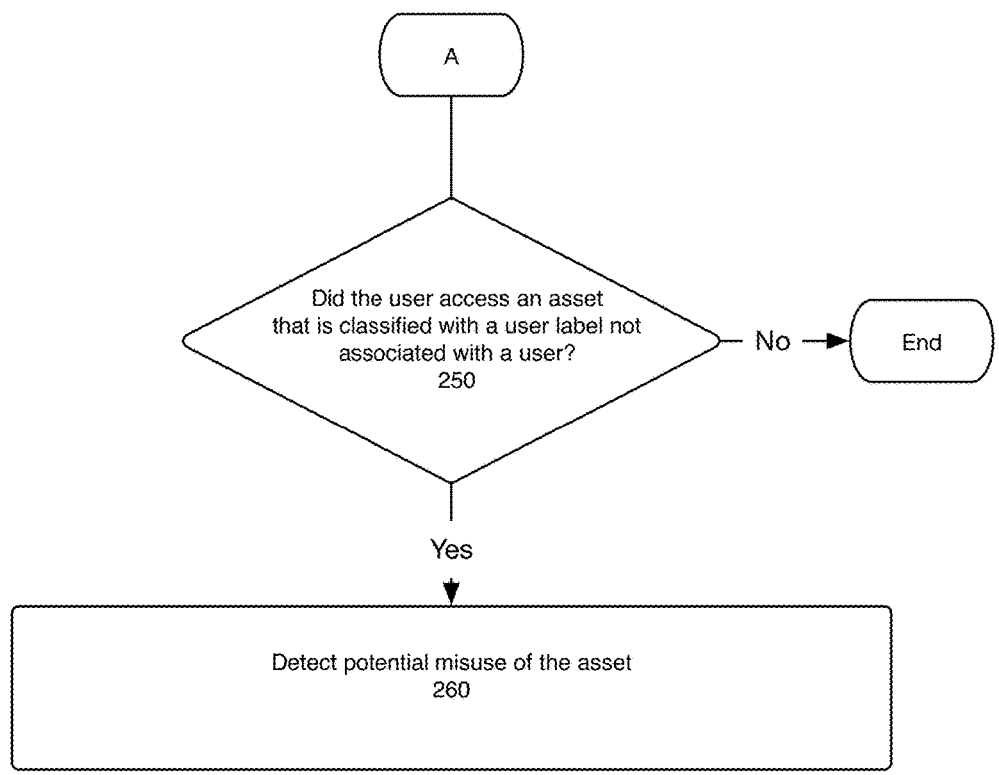

FIGS. 2A-B illustrate a method for detecting potential misuse of monitored assets using the classifications. The system parses event logs for events in which users access monitored assets (step 210). For each such event, the system identifies one or more user labels associated with the user (220). Such information may be read from an identity management system. The system then determines if the user is associated with a user label for which there is a data model (i.e., a select user label) (step 230). If so, the data model corresponding to the user label is updated accordingly. If the data model is limited to certain types of assets, step 230 also involves the system determining whether the asset accessed is the applicable type of asset (e.g., a workstation). In certain embodiments in which a risk score is calculated for a user's session, the system skips step 230 if the risk score for the user's session is above a risk threshold (i.e., considered anomalous).

The system also determines if the user accessed a monitored asset classified with a user label that the user does not have (step 240). If so, the system detects a potential misuse of the monitored asset by the user (step 250).

Certain assets may be used frequently by both users with and without a select user label. For example, servers and printers are examples of assets that are often shared by a variety of users. Consequently, the system distinguishes between personal assets and shared assets in classifying assets. In certain cases, the system may classify assets belonging to a group (e.g., a department) and in such cases the system distinguishes between assets typically associated with group (e.g., a particular floor in an office building) and those shared more widely in the enterprise.

In one embodiment, each asset in the system is associated with an asset label that indicates the type of asset (e.g., "workstation," "server," "phone," "office," etc.), and the system only adds asset types that are considered "personal assets" to a data model. Personal assets are assets that are typically used by one person, such as a workstation, smartphone, or individual office. A system administrator may specify which asset types are considered personal assets in configuring the system. The asset label associated with an asset may be entered by a system administrator, gathered from an asset management system, or determined by an automated behavior classifier of assets. Some data models may be limited to asset types that are considered group assets.

In an alternate embodiment, the system automatically determines whether an asset is a personal asset or a shared asset using the data models and counter-data models. In this embodiment, there is a counter-data model for each data model. The counter data model reflects devices accessed by users without the select user label of the data model. For example, if there is an "executive" data model, the counter-data model would reflect assets accessed by non-executive users. Assets used frequently in both the data model and counter-data model are considered shared data assets, and, therefore, will not be classified with the user label corresponding to the data model.

Figure 3:
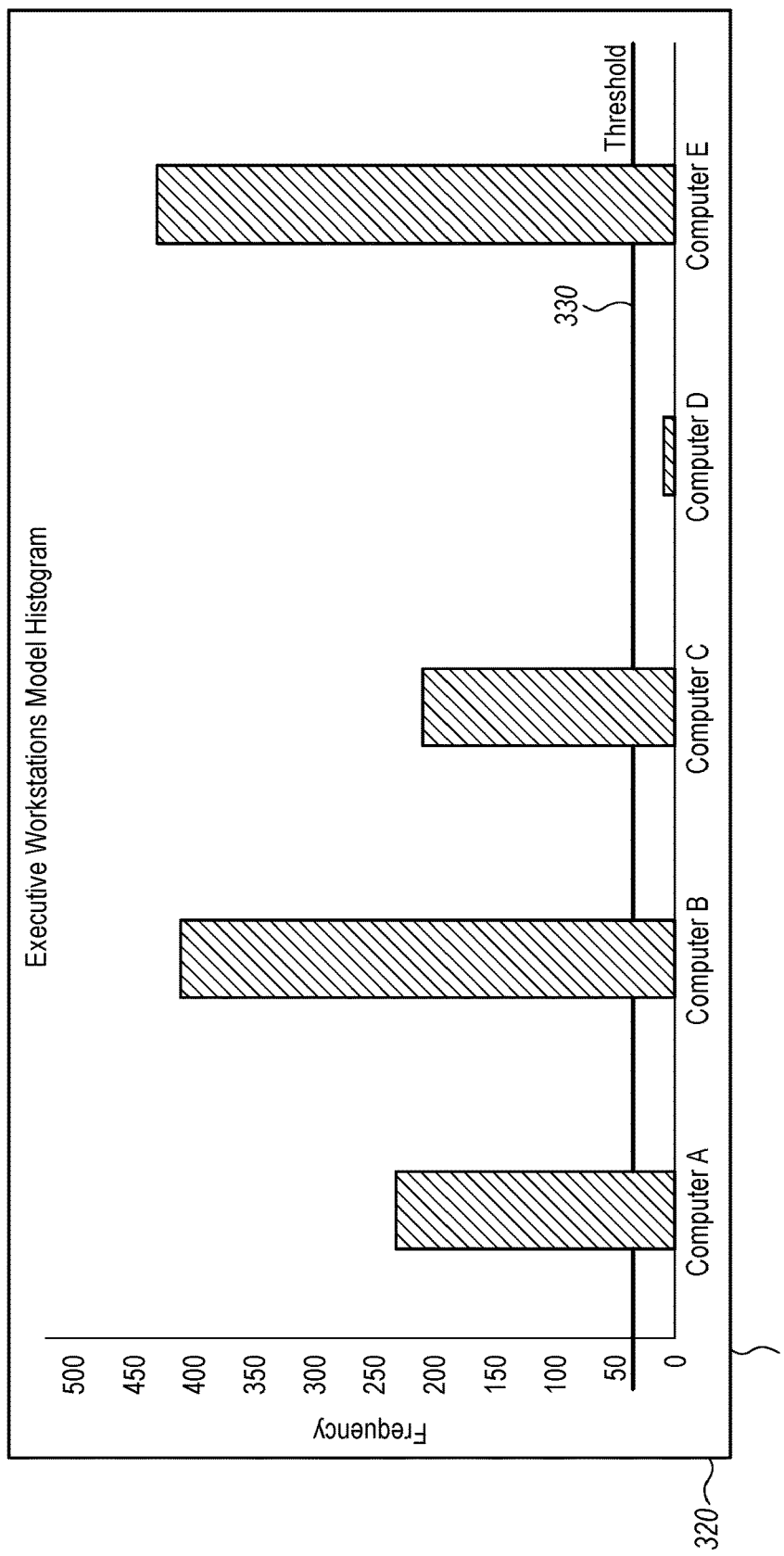
FIG. 3 illustrates an example histogram.

In one embodiment, the data models are categorical histograms. The asset values are along one axis (e.g., the x axis) and the frequency in which assets are accessed are along another axis (e.g., the y axis). FIG. 3 illustrates an example histogram for workstations with the "executive" label. On the x-axis 310 are the "bins" that represent the asset values (i.e., workstation values) received for the "executive" user label, and the values on the y-axis 320 are the number of times the asset has been accessed by an executive over a period of time. In certain embodiments, the period of time ranges from 14 days to 90 days. The longer the period of time, the better quality the data model is.

Figure 4:
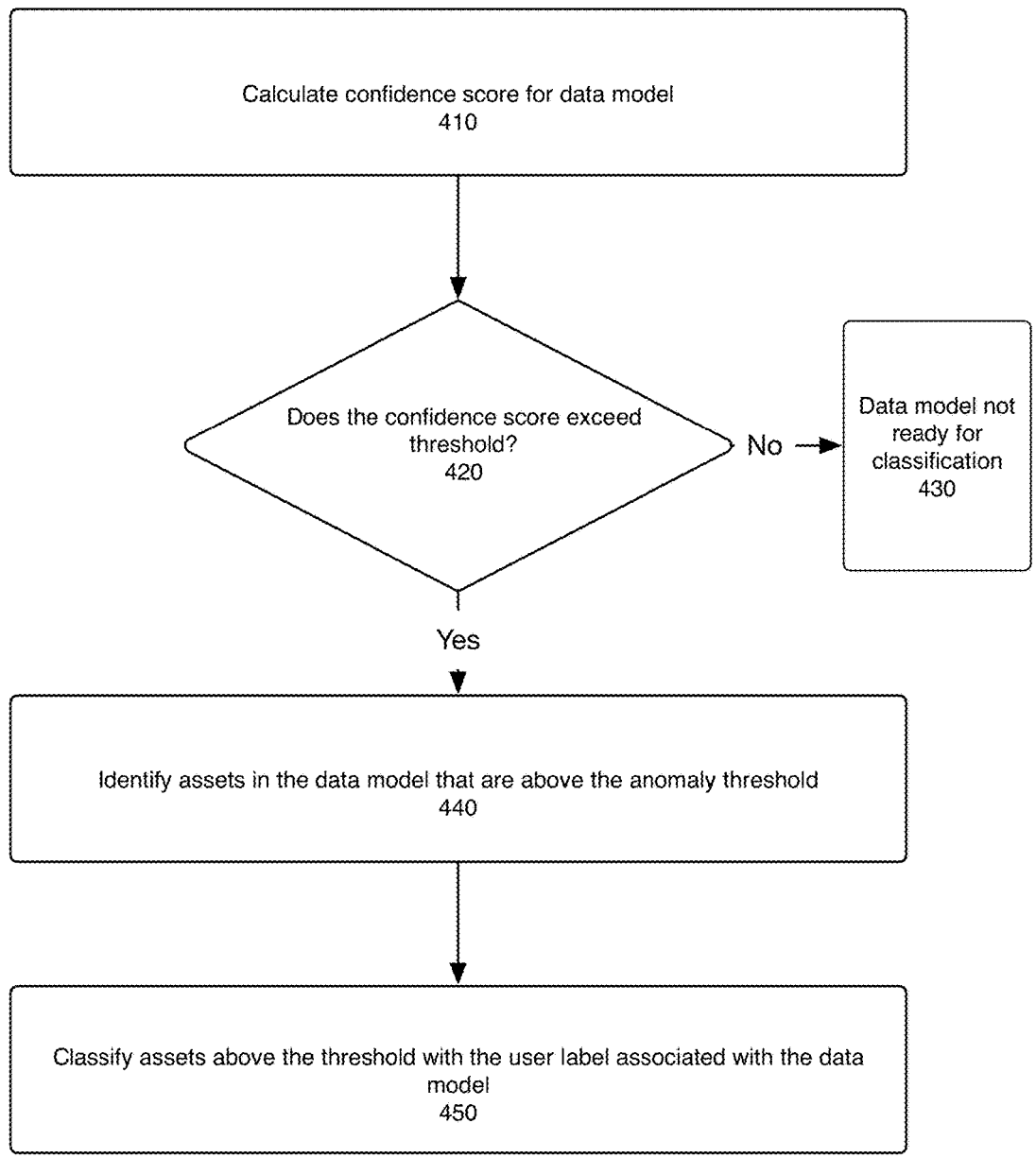
FIG. 4 is a flowchart that illustrates a method, according to one embodiment, for using a data model to identify which assets should be classified with a user label.

FIG. 4 illustrate an example way in which the system uses a data model to identify which assets should be classified with a user label (i.e., FIG. 4 illustrates an example way in which the system performs step 130 in FIG. 1). In order to determine whether the data model has sufficient data to distinguish between normal behavior and anomalous behavior, the system calculates a confidence score for the data model (step 410). In one embodiment, the confidence value is calculated as follows:

$$\text{Confidence factor} = \left[\frac{N-A}{N}\right]^{\alpha},$$

where N=the number of observed events, and A=the number of asset values received (i.e., the number of different types of assets in the data model). The coefficient ∝ affects how quickly the confidence factor converges to 1, and it can be modified to adjust the speed at which the confidence factor changes. In certain embodiments, ∝ ranges from 1-3.

In the above formula, the higher the number of observed event (N) and the lower the number of asset values received (A), the closer the confidence factor is to 1. Conversely, the closer the number of asset values (A) is to the number of observed events (N), the closer the confidence factor is to zero.

The system determines if the confidence value exceeds a threshold confidence factor (step 420). In one embodiment, a data model must have a confidence factor of 0.7 or 0.8 before it is used for classifying assets. In detecting potential misuse, the threshold confidence factor required may vary from rule to rule and may be specified in the rule expression.

If the confidence factor does not exceed the threshold, the data model is not ready to use for classification purposes (step 430). If the confidence factor exceeds the threshold, the system identifies the assets in the data model that are above an anomaly threshold (step 440). In one embodiment, the anomaly threshold is 10% of the highest frequency value (i.e., y axis value) in the data model, as illustrated with anomaly threshold 330 in FIG. 3. In this example, computer D is below the anomaly threshold. The anomaly threshold is placed to reduce "noise." For example, with a data model for the "executive" label, noise can happen when an executive user logs onto a machine that is not his (e.g., a vice president uses his secretary's computer to check email while they travel). In the data model in FIG. 3, if an executive receives a new computer, the frequency of usage will grow over a short period of time and will converge into the model as an executive asset once it exceeds the 0.1 percentile of usage. The assets above the threshold are classified with the user label associated with the data model (step 450).

In one embodiment, the system detects potential misuse of an asset by executing rules that trigger in response to a user without a select user label accessing an asset classified with a select user label. For example, below is pseudo language for a rule that triggers in response to a user without an "executive" label using a "workstation" asset classified as an "executive workstation" asset:

IF      (USER.LABEL!="executive")      AND (ASSET.TYPE="workstation") AND
    ASSET IN (MODEL("executive_workstations") AND MODEL.CONVERGED=true AND
    ASSET.MODEL_BIN_VALUE>0.1      PERCENTILE)
    THEN RULE.TRIGGER In the above example, the asset classification includes both the user label and asset label associated with the applicable data model in that assets are classified as "executive workstations." Furthermore, distinguishing personal assets from shared assets is built into the rule statement in that "ASSET.TYPE" is in the "IF" statement.

In one embodiment, the system performs the methods described herein in the context of calculating a risk assessment score for a user session. For example, the system may be the system for detecting and assessing security risks described in U.S. patent application Ser. No. 14/507,585, titled "System, Method, and Computer Program Product for Detecting and Assessing Security Risks in a Network," and filed on Oct. 6, 2014, the contents of which are incorporated by reference as if fully disclosed herein. In such system, when the system detects a potential misuse of an asset, the system increases a risk assessment score with the user's use of the enterprises' assets or networks (e.g., increases the risk assessment of a user's logon session).

Figure 5:
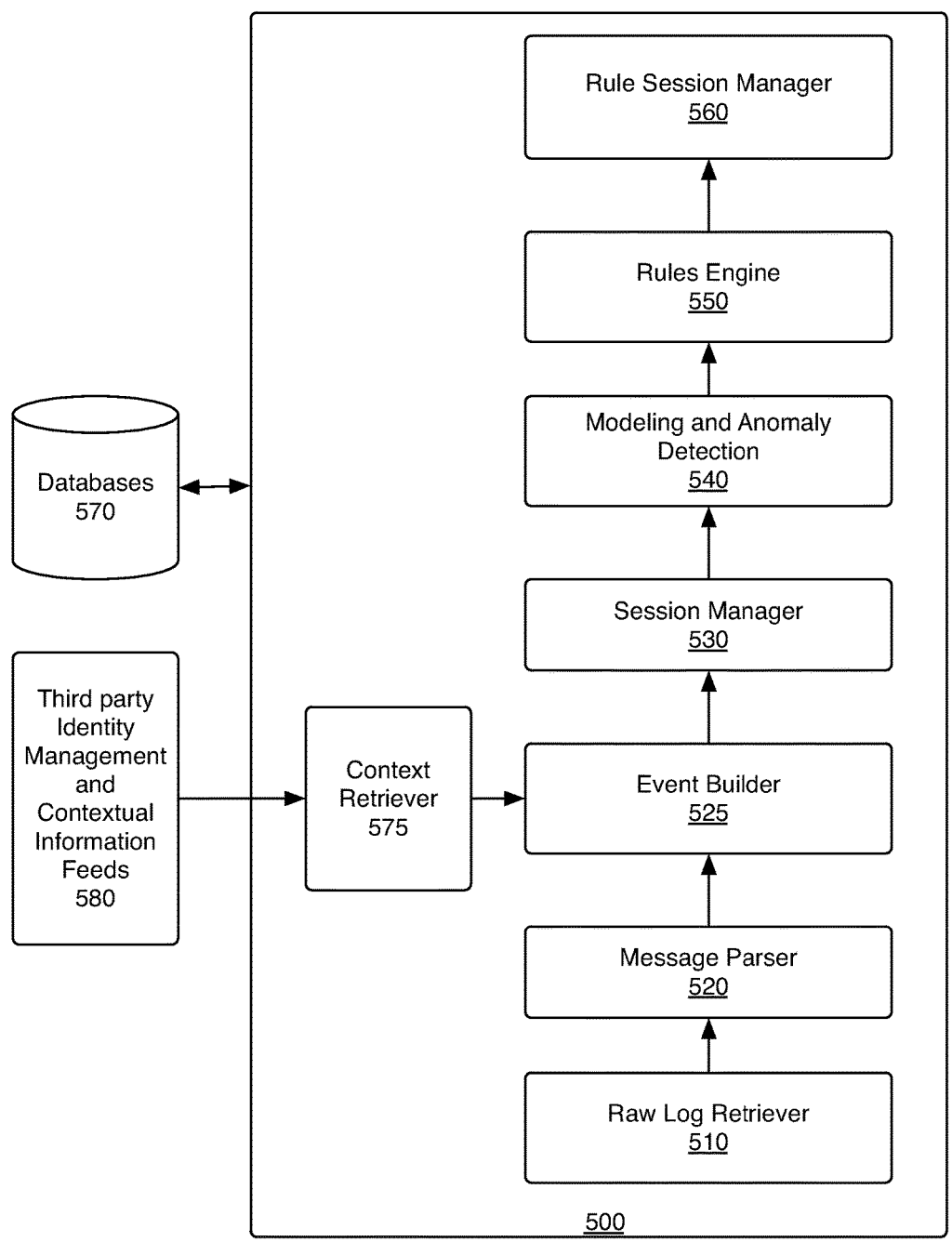
FIG. 5 is a block diagram that illustrates an example software architecture according to one embodiment.

FIG. 5 illustrates an example architecture for a system that performs the methods described herein in the context of calculating a risk score for a group of user events (e.g., a user logon session). However, the methods described herein may be implemented in other systems and are not limited to system 500.

The system includes a Raw Log Retriever 510, a Message Parser 520, an Event Builder 525, a Session Manager 530, a Modeling and Anomaly Detection 540, a Rules Engine 550, a Rule Session Manager 560, and a Context Retriever 575. Modules 510-560 are software modules that are executed on one or more computer systems. The system 500 stores event logs, rules, data models, and session scores (discussed below) in one or more databases 570 and accesses third party identity management and contextual information feeds 580.

The Raw Log Retriever module 510 obtains raw data logs related to a user's interactions with network-monitored assets (e.g., IT infrastructure, badge readers, etc.), such as user logon events, server access events, application access events, data access events, and access to physical location with electronic access. The raw data logs may be obtain from third party systems, such as SPLUNK, ARCSIGHT/HP, LOGLOGIC, HADOOP, SUMO LOGIC, LOGGLY, etc.

The Message Parser 520 identifies applicable user events from the raw data logs and creates event logs. The event logs are provided to the Event Builder 525, which then supplements the event logs with additional data that provide further context for user events, including user labels (e.g., "executive," "system administrator," etc.) and asset labels (e.g., "server," "workstation," etc.). The context data, such as the user labels and asset labels, is provided to the Event Builder 525 by the Context Retriever 575, which obtains third party identity management feeds (e.g., ACTIVE DIRECTORY™) and other third party contextual information feeds from within the local network or from remote networks accessed via the Internet.

The Event Builder 525 provides the context-enriched event logs to the Session Manager 530, which tracks user behavior through a session (e.g., logon session) by grouping the enriched event logs by user and session. Throughout a session, the Session Manager 530 records the current state of a user in a session database.

The Modeling and Detection module 540 creates and maintains the above-described data models used for classification. The Modeling and Detection module 540 uses the data models to classify assets with user labels in accordance with the methods described above (e.g., FIG. 4). In one embodiment, the Modeling and Detection module 540 parses the rule expressions to determine the classification and confidence threshold required by the rule expressions. In this embodiment, the rule dictate the type of data models created, and, therefore, the system is able to change its data models and types of classifications as rules are added, deleted, or modified. Also, the even Builder 525 or Context Retriever 575 may parse the rules to identify the user labels and asset labels to add to the event logs and determine where to retrieve such data (i.e., from local or external sources).

As described in U.S. patent application Ser. No. 14/507, 585, the Modeling and Detection Module also creates and maintains behavior data models for the user that are used to identify anomalous behavior in a user session.

The Modeling and Detection Module 540 makes the classifications, confidence factors, and anomaly calculations available to the Rules Engine 550 either by passing the results directly to the engine or storing them in a database accessible to the engine. The Rules Engine 550 executes risk score rules (including rules for detecting potential misuse of an assets) and determines which rules are triggered. The Rule Session Manager 560 keeps track of a risk score for each logon session. If the risk score and session meet certain criteria, the Rule Session Manager 560 displays an alert/notice regarding the session in the user interface. In one embodiment, an alert is displayed if a session meets one of the following criteria:

1. The session is a current session (i.e. it's on-going), and the risk score exceeds a threshold for a duration longer than a specified period of time (e.g., 1 hour); OR
2. The session has ended, and the final risk score for the session is above a threshold The Session Manager 560 may rank alerts displayed in the administrative interface based on risk scores.

In one embodiment, the data models (both for classification and detecting anomalous behavior) are updated with user events in the user session only if the risk score is below a threshold or otherwise considered normal. This prevents or minimizes abnormal behavior from skewing the data models.

The methods described with respect to FIGS. 1-5 are embodied in software and performed by a computer system (comprising one or more computing devices) executing the software. A person skilled in the art would understand that a computer system has one or more memory units, disks, or other physical (i.e., non-transitory), computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for classifying monitored assets based on user labels and for detecting potential misuse of monitored assets based on said classifications, the method comprising:
   accessing a mapping of users to user labels;
   using machine-learning-based modeling to classify one or more types of monitored assets with a select user label by performing the following:
      creating a data model that reflects monitored assets used by users associated with the select user label, wherein each time a user with the select user label accesses an applicable type of monitored asset, the data model is updated,
      creating a counter data model that reflects monitored assets used by users without the select user label,
      automatically determining whether an asset is a personal asset or a shared asset using the data model and counter data model, wherein a personal asset is a monitored asset used by users with the select user label and a shared asset is a monitored asset used by both users with and without the select user label, and
      using the data model to classify one or more monitored assets that are determined to be personal assets with the select user label; and
   detecting a potential misuse of a personal monitored asset classified with the select user label in response to a user without the select user label using the personal monitored asset, wherein detecting a potential misuse of a personal monitored asset results in increasing a risk assessment associated with the user's activities and wherein in response to the risk assessment meeting certain criteria, an alert is displayed in an administrative interface.

2. The method of claim 1, wherein using the data model to classify one or more monitored assets with the select user label comprises:
   identifying personal, monitored assets above a threshold frequency-of-use value in the data model; and
   classifying the identified monitored assets with the select user label.

3. The method of claim 1, wherein the select user label indicates that the user is an executive or high-privileged user in an enterprise.

4. The method of claim 1, wherein the data model is a histogram with the monitored assets on one axis, and frequency-of-use values on another axis.

5. The method of claim 1, wherein personal assets include workstations, phones, tablet computing devices, and personal offices.

6. The method of claim 1, wherein the computer system calculates a risk score for each user session in the system, and the data model is updated with a qualifying access event only in response to the user's risk score being below a risk threshold.

7. A non-transitory, computer-readable medium comprising a computer program, that, when executed by a computer system, enables the computer system to perform the following method for classifying monitored assets based on user labels and for detecting potential misuse of monitored assets based on said classifications, the method comprising:
   accessing a mapping of users to user labels;
   using machine-learning-based modeling to classify one or more types of monitored assets with a select user label by performing the following:
      creating a data model that reflects monitored assets used by users associated with the select user label, wherein each time a user with the select user label accesses an applicable type of monitored asset, the data model is updated,
      creating a counter data model that reflects monitored assets used by users without the select user label,
      automatically determining whether an asset is a personal asset or a shared asset using the data model and counter data model, wherein a personal asset is a monitored asset used by users with the select user label and a shared asset is a monitored asset used by both users with and without the select user label, and
      using the data model to classify one or more monitored assets that are determined to be personal assets with the select user label; and
   detecting a potential misuse of a personal monitored asset classified with the select user label in response to a user without the select user label using the personal monitored asset, wherein detecting a potential misuse of a personal monitored asset results in increasing a risk assessment associated with the user's activities and wherein in response to the risk assessment meeting certain criteria, an alert is displayed in an administrative interface.

8. The non-transitory, computer-readable medium of claim 7, wherein using the data model to classify one or more monitored assets with the select user label comprises:
   identifying personal, monitored assets above a threshold frequency-of-use value in the data model; and
   classifying the identified monitored assets with the select user label.

9. The non-transitory, computer-readable medium of claim 7, wherein the select user label indicates that the user is an executive or high-privileged user in an enterprise.

10. The non-transitory, computer-readable medium of claim 7, wherein the data model is a histogram with the monitored assets on one axis, and frequency-of-use values on another axis.

11. The non-transitory, computer-readable medium of claim 7, wherein personal assets include workstations, phones, tablet computing devices, and personal offices.

12. The non-transitory, computer-readable medium of claim 7, wherein the computer system calculates a risk score for each user session in the system, and the data model is updated with a qualifying access event only in response to the user's risk score being below a risk threshold.

13. A computer system for classifying monitored assets based on user labels and for detecting potential misuse of monitored assets based on said classifications, the system comprising:
   one or more processors;
   one or more memory units coupled to the one or more processors, wherein the one or more memory units store instructions that, when executed by the one or more processors, cause the system to perform the operations of:
   accessing a mapping of users to user labels;
   using machine-learning-based modeling to classify one or more types of monitored assets with a select user label by performing the following:
      creating a data model that reflects monitored assets used by users associated with the select user label, wherein each time a user with the select user label accesses an applicable type of monitored asset, the data model is updated,
      creating a counter data model that reflects monitored assets used by users without the select user label,
      automatically determining whether an asset is a personal asset or a shared asset using the data model and counter data model, wherein a personal asset is a monitored asset used by users with the select user label and a shared asset is a monitored asset used by both users with and without the select user label, and
      using the data model to classify one or more monitored assets that are determined to be personal assets with the select user label; and
   detecting a potential misuse of a personal monitored asset classified with the select user label in response to a user without the select user label using the personal monitored asset, wherein detecting a potential misuse of a personal monitored asset results in increasing a risk assessment associated with the user's activities and wherein in response to the risk assessment meeting certain criteria, an alert is displayed in an administrative interface.

14. The system of claim 13, wherein using the data model to classify one or more monitored assets with the select user label comprises:
   identifying personal, monitored assets above a threshold frequency-of-use value in the data model; and
   classifying the identified monitored assets with the select user label.

15. The system of claim 13, wherein the select user label indicates that the user is an executive or high-privileged user in an enterprise.

16. The system of claim 13, wherein the data model is a histogram with the monitored assets on one axis, and frequency-of-use values on another axis.

17. The system of claim 13, wherein personal assets include workstations, phones, tablet computing devices, and personal offices.

18. The system of claim 13, wherein the system calculates a risk score for each user session in the system, and the data model is updated with a qualifying access event only in response to the user's risk score being below a risk threshold.

* * * * *